United States Patent

Akimoto et al.

[11] 4,001,594
[45] Jan. 4, 1977

[54] METHOD FOR CONTROLLING THE QUANTITY OF EXPOSURE IN PHOTOGRAPHIC PRINTING

[75] Inventors: Taizo Akimoto; Takaaki Terasita; Shigeru Watanabe, all of Minami-ashigara, Japan

[73] Assignee: Fuji Photo Film Co., Ltd., Minami-ashigara, Japan

[22] Filed: June 20, 1975

[21] Appl. No.: 588,984

[30] Foreign Application Priority Data

June 21, 1974 Japan .............................. 49-71636

[52] U.S. Cl. ........................ 250/559; 250/214 AG; 356/202
[51] Int. Cl.² ........................................ G01N 21/30
[58] Field of Search .............. 250/559, 571, 214 R, 250/214 AG; 356/202, 203; 355/68, 69

[56] References Cited

UNITED STATES PATENTS

| | | | |
|---|---|---|---|
| 3,560,757 | 7/1969 | Pugsley | 250/559 |
| 3,652,791 | 3/1972 | Shuey | 250/214 AG |
| 3,690,765 | 9/1972 | Richard et al. | 356/202 |
| 3,856,413 | 12/1974 | Bey et al. | 356/202 |

*Primary Examiner*—David C. Nelms
*Attorney, Agent, or Firm*—Sughrue, Rothwell, Mion, Zinn & Macpeak

[57] ABSTRACT

An improved method for controlling the quantity of exposure in photographic printing to obtain high-quality prints is disclosed. The method is carried out by photoelectrically detecting a plurality of optical densities from a principal portion of a negative film then discriminating the maximum value and the minimum value of the photoelectrically detected optical densities. The difference between the maximum and minimum values is calculated to achieve a first output, and the first output is non-linearly converted and combined with the maximum or minimum value output to achieve a third output for controlling the quantity of exposure. The method provides satisfactory prints even from those negative films having principal subject density failures or color failures.

4 Claims, 9 Drawing Figures

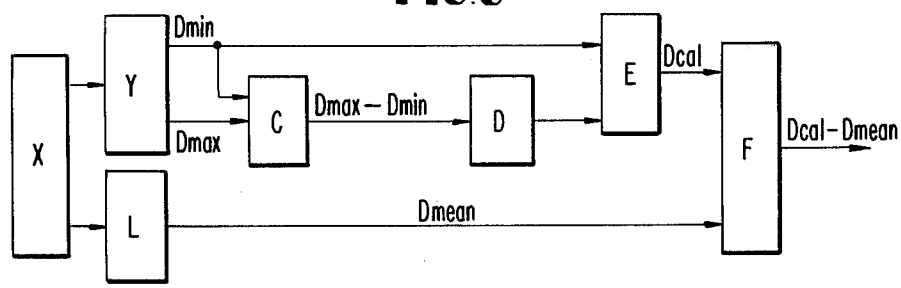
FIG.6
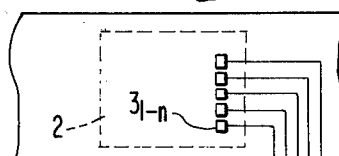
FIG.7
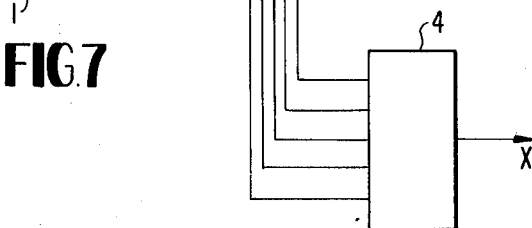
FIG.8
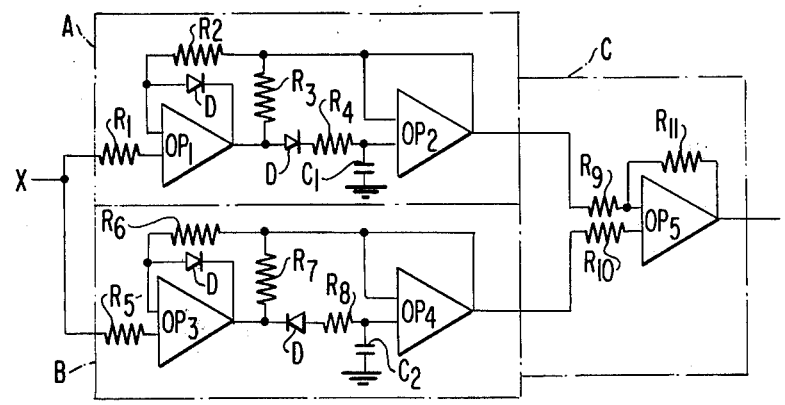
FIG.9
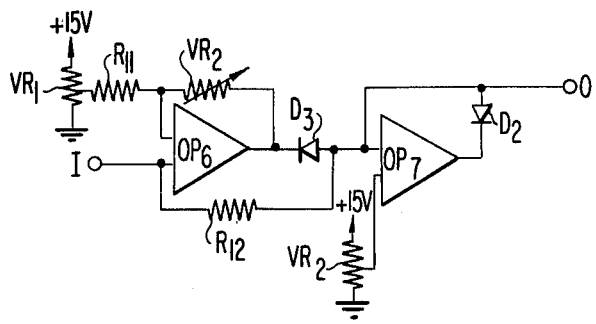

METHOD FOR CONTROLLING THE QUANTITY OF EXPOSURE IN PHOTOGRAPHIC PRINTING

BACKGROUND OF THE INVENTION

1. Field of the Invention

The present invention relates to a method for controlling the quantity of exposure in photographic printing, wherein, in a process of negative and positive photographic printing, a maximum density and a minimum density of a negative photographic film are measured, which are used with tonal signals obtained therefrom to obtain prints printed to have a proper printing density even from a negative film having principal subject density failures.

2. Description of the Prior Art

Conventional methods for controlling the quantity of printing exposure so far known are as follows:

1. a method for controlling the quantity of printing exposure by measurement of only the mean transmission density of a negative photographic film, and
2. a method for controlling the quantity of printing exposure by measurement of the mean density and the tonal difference of a negative photographic film.

Conventional methods for controlling the quantity of printing exposure as described above possess various significant disadvantages. That is, in method (1), in which only the mean transmission density of the negative film is measured, the mean transmission density over substantially the entire area of the negative film is measured so that even for the same principal subject (a portrait in most cases), the mean transmission density differs in the case of a negative film which is greatly different in density in the periphery thereof, and accordingly, the printing exposure time will also differ. This results in disadvantages. For example, a portrait in which snow or the sky is a background will generally be a print which has an excessively high density whereas a portrait taken at night using a flash will be a print which has an excessively low density. These disadvantages as noted above result from the utilization in the above-described described method of only the average value of the density irrespective of the mode of density distribution on the negative film.

For the purpose of comparison, density distributions corresponding to various points on the image plane of an actual negative film are given. FIGS. 1 to 3 illustrate the density distributions of the image plane, in which the relative sensitivity of a typical amateur negative film with respect to various colors is measured in a ratio of 1:1:1, where the abscissa represents the density and the ordinate represents the number of portions having the respective density.

FIG. 1 shows what is called a "PROPER NEGATIVE" density distribution, in which a good print is obtained when printing is carried out with the mean transmission density as a reference and which has the characteristics of a regular distribution on the whole, and the density of a principal subject (as indicated by the narrow upwardly pointing arrow) and the mean transmission density (as indicated by the broad downwardly pointing arrow) (hereinafter merely referred to as "mean density"), each density on the whole coinciding with a value in the middle of the distribution. The negative film as described above can be successfully printed in a conventional process of printing with only the mean density as a reference.

FIG. 2 shows the density distribution of a portrait with a light background, in which a second peak can be seen on the side of a high density corresponding to an area with a light background. In this case, the density of the principal subject has a value greatly different from that of the mean density, and hence a satisfactory print can not be obtained in a process of printing with only the mean density as a reference, resulting in the necessity for correcting the quantities of exposure corresponding to the difference therebetween.

FIG. 3 shows the density distribution of a portrait with a dark background, in which a second peak can be seen on the side of a low density corresponding to an area with a dark background. In this case, the density of the principal subject has a value greatly different from that of the mean density, and hence a satisfactory print can not be obtained in a process of printing with only the mean density as a reference, resulting in the necessity of correcting the quantity of exposure corresponding to the difference therebetween.

The correction here required in these two instances described above should be achieved by using the density of the principal subject in addition to the conventional mean density. However, with techniques currently used, it is difficult to extract the principal subject automatically for the measurement of density. An alternate method has been proposed, in which the density in the center of the image plane is utilized, but good results have not yet been obtained.

An apparatus for controlling the quantity of printing exposure which has removed those disadvantages noted above with respect to the above-described method for controlling the quantities of printing exposure using the mean transmission density is disclosed in Japanese Patent (OPI) 34,535/1973. In such an apparatus, the quantity of printing exposure is controlled by the mean density of a negative film and the tonal difference. In the apparatus as described above, a plurality of photoelectric conversion means is arranged over the entire surface of the negative film to obtain the maximum density, the minimum density and the mean density of the negative film, and (1) the mean value between the maximum density and the minimum density and the difference between the maximum density and the minimum density, that is, the tonal differences are calculated therefrom, calculating the approximate sum thereof, or (2) the difference between the above-described mean value and the mean density is calculated and the approximate sum of the above-described maximum density and minimum density difference and the above-described tonal difference is further calculated. Thus, either one of the foregoing means is used to control the quantity of printing exposure.

The apparatus as described above is superior in some respects to the conventional apparatus for controlling the quantity of printing exposure using only the mean density, while the apparatus has the following disadvantages. That is to say, the quantity of printing exposure is represented, unconditionally, by the approximate sum of the mean value between the maximum density and the minimum density (hereinafter, "intermediate density") and the difference between the maximum density and the minimum density (hereinafter, "tonal difference"). Therefore, if the apparatus is employed as the apparatus for controlling the quantity of printing exposure which is suitable for printing a negative film photographed under appropriate conditions, it is obvious that a negative film, for example, having the same density of the principal subject as that of the negative film previously described but having a small tonal difference as a whole is subjected to excessive printing exposure, resulting in a failure to obtain a satisfactory print. As an alternative example, in case of a negative film photographed under excessive exposure conditions, it is obvious that the film lacks exposure, also resulting in a failure to obtain a satisfactory print.

The unsatisfactory prints as described above result from a control by the apparatus of the quantity of printing exposure based on the intermediate density of the negative film and the tonal difference. Although both the intermediate density of the negative film and the tonal difference as described above can serve as information representative of significant characteristics of the negative film, it is not advisable to apply the approximate sum thereof unconditionally to the control of the quantity of printing exposure. The reason is that the intermediate density of the negative film usually represents a value close to the mean density of the negative film, and the effect of the intermediate density and the tonal difference exerted on the density distribution of the negative film is not always considered unconditionally but there are some negative films whose density distribution differs greatly. For example, in the case of two negative films whose maximum density and minimum density are nearly the same (as a consequence, the tonal difference is also nearly the same) but whose mean density is greatly different from each other, it is obvious that satisfactory prints are impossible to obtain from the negative film using the apparatus for controlling the quantity of printing exposure as disclosed in Japanese Patent (OPI) No. 34,535/1973 with the intermediate density and the tonal difference. A further disadvantage involved in the above-described apparatus is that the object for measurement of the maximum density and the minimum density is substantially the entire surface of the negative film so that a satisfactory print can not be obtained from a negative film having principal subject density failures.

SUMMARY OF THE INVENTION

The present invention provides a novel method for controlling the quantity of printing exposure whose object is to obtain high-quality prints, while removing those disadvantages noted above with respect to prior art apparatus for controlling the quantity of printing exposure.

More specifically, the present invention provides a novel method for controlling the quantity of printing exposure in a photographic printing process comprising photoelectrically measuring the maximum density and the minimum density of a negative photographic film, which are used with tonal signals obtained therefrom to obtain prints printed to have a proper printing density even from a negative film having principal subject density failures.

These objects of the present invention are attained by photoelectrically detecting a plurality of optical densities from a principal portion of a negative film, discriminating the maximum value and the minimum value of the output from the photoelectric determination, determining the maximum and minimum photoelectrically determined optical density values, non-linearly converting the output from the determination of the maximum and minimum values, and combining the output from the conversion with the output from the determination of the maximum value or minimum value to control the quantity of exposure.

BRIEF DESCRIPTION OF THE DRAWINGS

The present invention will be more fully understood from the following description when taken in conjunction with the accompanying drawings.

FIG. 6 is a block diagram showing another mode of an embodiment according to the present invention.

FIG. 7 shows an embodiment of a photoelectric conversion means.

FIG. 8 is a circuit diagram showing means for discriminating the maximum density, minimum density and tone.

FIG. 9 is a circuit diagram showing a non-linear conversion means.

DESCRIPTION OF THE PREFERRED EMBODIMENTS

Figure 1:
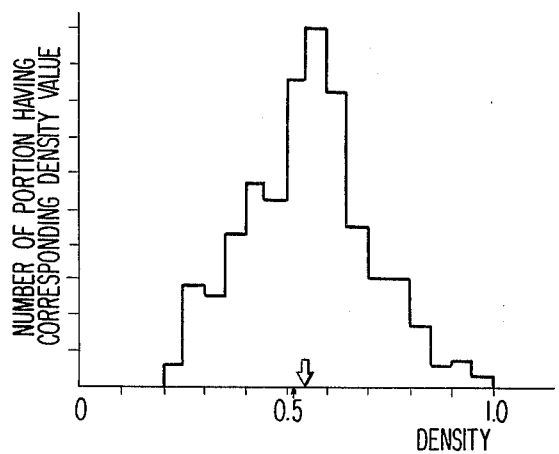
FIGS. 1 to 3 are graphical representations illustrating density distributions on the image plane of a negative film.
Figure 2:
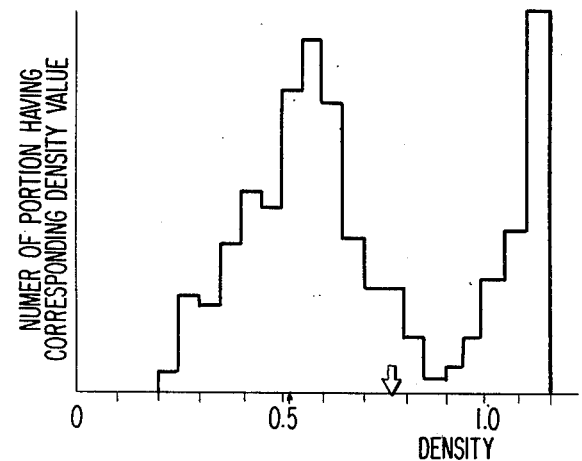
Figure 4:
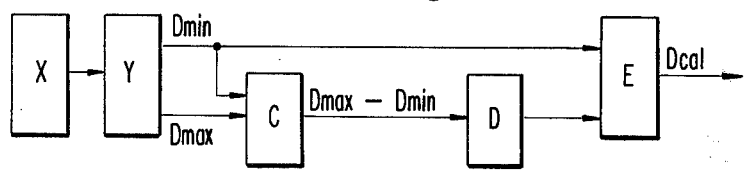
FIG. 4 is a block diagram showing a mode of an embodiment according to the present invention.
Figure 3:
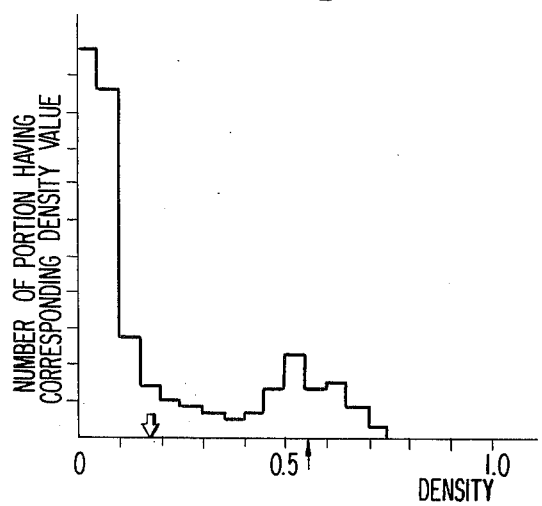
Figure 5:
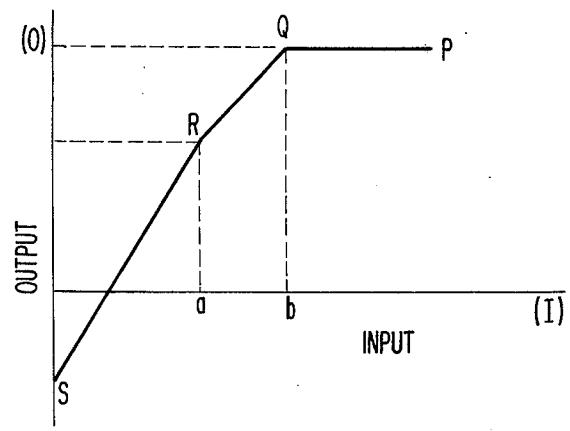
FIG. 5 is a curve showing a linear or non-linear conversion.

FIG. 4 is a block diagram showing the concept of the present invention. In FIG. 4, the reference character X designates a photoelectric conversion means, e.g., means comprising a projector for projecting light through the negative film and light receiving devices for receiving and measuring the amount of light passed, for detecting the density of a negative film, Y designates a maximum and minimum density discriminating means, C designates a tone discriminating means, D designates a means for carrying out a linear or non-linear conversion, and E designates an addition means. The photoelectric conversion means X detects a plurality of optical density signals from a principal portion of a negative film, the maximum and minimum density discriminating means Y discriminates the maximum value (D max) and the minimum value (D min) from the plurality of density signals, and the tone discriminating means C provides a tonal signal (D max − D min). This tonal signal is converted as shown in FIG. 5 by the linear or non-linear conversion means D, after which the signal is added to the minimum density signal to obtain a printing exposure control signal (D cal).

For a better understanding of the effects of the present invention, a detailed description will be given with reference to embodiments thereof. FIG. 7 shows one example of a photoelectric conversion means which comprises a plurality of light receiving devices 3 for detecting the density in various portions corresponding to the principal portion of the negative film, and a multiplexor 4 for obtaining the output from the light receiving devices. In this case, the detection of the density in the negative film is limited to a certain area to prevent the printing exposure condition of a principal subject in an ordinary negative film from being affected by the density in the peripheral portions unrelated thereto. According to the results obtained statistically using many negative films, it has been found that the best result was produced when the detection area as described above was set in the range of from about 20 to 40% in the central portion of the entire image plane of the negative film. As a consequence, the above-described light receiving devices 3 and the multiplexor 4 are set to detect only the density from those portions as described above of the travelling negative film.

FIG. 8 shows one example of a means for obtaining the maximum value of and the minimum value of the output from the photoelectric conversion means, as well as the difference therebetween (tonal signal). In FIG. 8, the output X from the photoelectric conversion means $3_1 \ldots 3_n$ is successively obtained by the multiplexor, and the maximum value of the output X is discriminated in a circuit A including operational amplifiers $OP_1$ and $OP_2$, the minimum value thereof in a circuit B including operational amplifiers $OP_3$ and $OP_4$, and the difference therebetween (tonal signal) in a circuit C including an operational amplifier $OP_5$. FIG. 9 shows one example of a non-linear conversion means as shown in FIG. 5, where I is the input, and O is the output.

The slope of the linear portion RS can be controlled by variable resistor $VR_2$, the position of point R by variable resistor $VR_1$, and the position of point Q by variable resistor $VR_3$, respectively.

According to the present invention, high-quality prints can be obtained by a non-linear conversion of the value of the tonal difference in the negative film, for example, as shown in FIG. 5, even from those negative films which previously have been difficult to obtain high-quality prints in the conventional photographic printing method. The reason is that in the case of a negative film having an extremely large tonal difference, the tonal difference may be clipped at a certain upper limit value to produce an effect in which the quantity of exposure is decreased. In addition, in the case of a negative film (such as those subjected to a super-over exposure or a super-under exposure) whose tonal difference is so low that it does not reach a certain value (FIG. 5a), the above-described feature of the invention is derived from the fact that the output corresponding to the tonal difference may be decreased to produce an effect in which the quantity of exposure is decreased.

As described above, the present invention provides extremely important effects for practical use by employment of a conversion, in which when the value of the tonal difference exceeds a desirable range (within which a successful result may be obtained in the manner of printing normally), the tonal difference is clipped at the upper limit (e.g., "b" in FIG. 5) in the range as described above, whereas when the value thereof does not reach the above-described range, the output is further decreased.

For a better understanding of the effects of the present invention, an example will be described hereinafter. Printing experiments have been conducted with many negative films for various measured values as previously described, that is, mean transmission density (D mean), maximum density (D max) and minimum density (D min) in the above-described limited range of measurement with these characteristic values and the combined value of more than two characteristic values of these values used as the reference. From the results of such experiments a correlation coefficient between the above-described characteristic values and the exposure time at which a proper print was obtained was determined. The results obtained are given in the following table.

| Characteristic Value | Correlation Coefficient |
|---|---|
| D mean | 0.7176 |
| D max | 0.6411 |
| D min | 0.7393 |
| D max − D min | 0.2523 |
| D mean + ½ (D min + D max) | 0.7841 |
| D mean + ½ (D max − D min) | 0.7870 |
| D min + ½ (D max − D min) | 0.8043 |
| D min + ½ (D max − D min) | 0.8511 |
| Here, $\alpha \leq$ D max − D min $\leq \beta$ | |

The results in the above table demonstrate outstanding effects can be achieved where more than two characteristic values are combined, although this may be a result of the fact that the measurement area of various measured values is limited as previously described. The table shows that the characteristic value D mean + ½ (D max − D min) analogous to the technique disclosed in Japanese Patent (OPI) No. 34,535/1973 previously referred to, that is, the control of the quantity of printing exposure with the mean density and the tonal difference is also relatively effective, but it can be seen that the former is inferior to the control of the quantity of printing exposure with the minimum density and the tonal difference. In addition, in a negative film having a value of D max − D min which exceeds a range provided with a suitable upper limit and lower limit relative to the D max − D min value in the characteristic value D min + ½ (D max − D min), the value of D max − D min can be kept at the above-described upper limit and lower limit to attain a higher quality print.

The foregoing results result in a control signal D cal given by $$D \text{ cal} = D \text{ min} + k (D \text{ max} - D \text{ min} + \delta)$$

Here, $\alpha \leq D \text{ max} - D \text{ min} \leq \beta$ to serve as the control signal D cal for controlling the quantity of printing exposure to obtain a proper print even from a negative film having principal subject density failures. In the above expression, $k$ and $\delta$ are experimentally determined constants. Further, when D max − D min < $\alpha'$, the relation of D max − D min = $\alpha$ must be observed, and when $\beta$ < D max − D min, the relation of D max − D min = $\beta$ must be observed.

A description of photoelectric conversion means X is given below. In the case of a black-and-white negative film, no particular problem will arise. However, in the event that the density measurement is carried out with a color negative film, it is necessary to measure the density variation of cyan, magenta and yellow colors, each of which are equally important. In the example of the present invention, the relative sensitivity relative to the respective colors is set at a ratio of 1:1:1 to keep the influence due to the color as small as possible even in a color negative film having what is called a color failure.

Furthermore, the method of the present invention can be utilized in addition with a printer which uses the conventional method for controlling the quantity of printing exposure with the mean transmission density, which will be described hereinbelow. FIG. 6 is a block diagram showing the concept of the present invention as may be applied to the case hereinabove described. In FIG. 6, the reference characters X, Y, C and D designate the same means as those employed in FIG. 4, the reference character L designates conventional means for obtaining a mean transmission density signal (D mean), and the reference character F designates means for calculating the difference between the printing exposure control signal (D cal) and the mean transmission density signal (D mean). The operation required until the printing exposure control signal (D cal) is obtained can be accomplished in the manner as previously described, and in order to apply the above-described operation to a printer which uses the conventional method for controlling the quantity of printing exposure with the mean transmission density, the difference therebetween is obtained as an output.

From the foregoing, it will be apparent in the apparatus for controlling the quantity of printing exposure according to the present invention that satisfactory prints can be obtained even from various negative films such as negative films having principal subject density failures, color negative films having color failures, negative films having an excessively high tonal difference or an excessively low tonal difference, etc., unlike the conventional apparatus where satisfactory prints cannot be obtained, resulting in an extremely important effect in reducing cost of photographic prints with an improvement in the efficiency of photographic printing process and a decrease in the number of inferior prints.

While the invention has been described in detail and with reference to specific embodiments thereof, it will be apparent to one skilled in the art that various changes and modifications can be made therein without departing from the spirit and scope thereof.

What is claimed is:

1. In a method for measuring the transmission density of a negative film to generate a control signal for controlling the quantity of exposure in photographic printing, the method for controlling the quantity of exposure in photographic printing comprising the steps of:
   photoelectrically detecting a plurality of optical densities in a principal portion of the negative film,
   discriminating among the photoelectrically detected optical densities the maximum value and the minimum value of the optical density,
   calculating the difference between said maximum value and said minimum value,
   non-linearly converting said calculated difference, and
   adding the non-linear conversion of said calculated difference and the discriminated minimum value to control the quantity of printing exposure.

2. The method of claim 1, wherein said step of photoelectric detecting is performed by using a plurality of light receiving devices.

3. The method of claim 1, wherein said detecting of said plurality of optical densities comprises detecting the optical densities in the central portion of the negative film and to the extent of from about 20 to 40% of the area of the negative film.

4. The method of claim 1, further comprising the steps of:
   generating a mean transmission density value from the photoelectrically detected optical densities, and
   calculating the difference between the printing exposure control value and said mean transmission density value.

* * * * *